United States Patent [19]

Yamakawa

[11] Patent Number: 4,662,490

[45] Date of Patent: May 5, 1987

[54] CLUTCH SYSTEM FOR AN INTERNAL COMBUSTION ENGINE PROVIDED WITH A PLURALITY OF ENGINE UNITS

[75] Inventor: Toru Yamakawa, Hachioji, Japan

[73] Assignee: Fuji Jukogyo Kabushiki Kaisha, Tokyo, Japan

[21] Appl. No.: 485,580

[22] PCT Filed: Sep. 8, 1982

[86] PCT No.: PCT/JP82/00358

§ 371 Date: Mar. 21, 1983

§ 102(e) Date: Mar. 21, 1983

[87] PCT Pub. No.: WO83/00906

PCT Pub. Date: Mar. 17, 1983

[30] Foreign Application Priority Data

Sep. 9, 1981 [JP] Japan ............................. 56-142766

[51] Int. Cl.[4] .................. B60K 41/02; F01B 21/02
[52] U.S. Cl. ........................... 192/0.07; 60/718; 74/661; 192/0.098
[58] Field of Search ............... 192/0.098, 0.07; 74/661; 418/196; 60/718, 709

[56] References Cited

U.S. PATENT DOCUMENTS

| 1,585,731 | 5/1926 | Oakes | 418/196 X |
| 2,317,324 | 4/1943 | Wolf | 74/661 |
| 2,675,102 | 4/1954 | Robinson | 192/0.07 |
| 2,760,612 | 8/1956 | Brooks | 192/0.098 |
| 2,791,913 | 5/1957 | Slack | 192/0.07 X |
| 4,392,393 | 7/1983 | Montgomery | 74/661 |
| 4,421,217 | 12/1983 | Vagias | 192/0.098 |

FOREIGN PATENT DOCUMENTS

| 179485 | 9/1954 | Austria | 192/0.07 |
| 42-26050 | 12/1967 | Japan . | |
| 833325 | 4/1960 | United Kingdom | 74/661 |

Primary Examiner—Rodney H. Bonck
Attorney, Agent, or Firm—Martin A. Farber

[57] ABSTRACT

A system for controlling a clutch for a plurality of independent engine units, in which gears of the engine units are engaged with a gear of an output shaft and are arranged to form a pump chamber, the output fluid of the pump chamber being used for operating the clutch so as to connect engine units with each other.

7 Claims, 4 Drawing Figures

CLUTCH SYSTEM FOR AN INTERNAL COMBUSTION ENGINE PROVIDED WITH A PLURALITY OF ENGINE UNITS

BACKGROUND AND FIELD OF THE INVENTION

The present invention relates to a clutch system of a multi-stage internal combustion engine for a vehicle comprising two or more power or engine units, which are combined in response to driving conditions of the vehicle for effectively generating power.

BACKGROUND ART

The cylinder volume or displacement of the internal combustion engine is constant during operation. Particularly, since engines for vehicles operate in a wide output range, the fuel consumption is inevitably increased. In order to eliminate such disadvantages, there is provided an internal combustion engine having a plurality of engine units and a clutch for coupling an output shaft of one of the engine units to another output shaft for producing combined power.

For example, Japanese patent publication No. 42-26050 discloses an internal combustion engine, in which a pair of engine units are disposed in parallel and the power of both units are combined to produce a combined power in accordance with the load on the engine. However, the publication does not describe in detail a clutch for combining both powers.

SUMMARY OF THE INVENTION

It is an object of the present invention to provide a clutch system of an internal combustion engine comprising a plurality of engine units which are connected by a oil-pressure-operated friction clutch. Oil pressure for engaging the clutch is supplied by a gear pump made by modifying a gear train which is provided for combining the power of the engine units.

DESCRIPTION OF THE PREFERRED EMBODIMENTS

Figure 1:
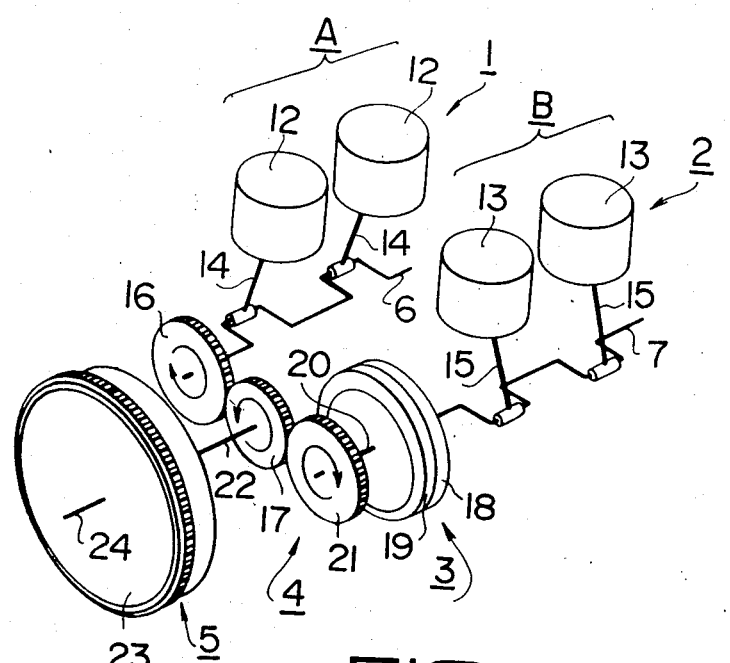
FIG. 1 is a schematic perspective view of an engine according to the present invention.

Referring to FIGS. 1 to 4 showing an internal combustion engine comprising engines A and B each having two cylinders. The engine comprises a first engine unit 1, a second engine unit 2, an oil-pressure-operated friction clutch 3 driven by the engine unit 2, an output shaft portion 4 and a flywheel portion 5 connected to the output shaft portion 4. Each of the engine units 1 and 2 comprises an independent two-cylinder engine having an independent ignition system. Both engine units are the same in cylinder volume. The engine unit 1 comprises a pair of pistons 12 connected to a crankshaft 6 by connecting rods 14, and the engine unit 2 comprises a pair of pistons 13 connected to a crankshaft 7 by connecting rods 15 respectively. A gear 16 of the output shaft portion 4 is secured to an end of the crankshaft 6 and engaged with an output gear 17. The clutch 3 comprises a drive member 18 secured to the crankshaft 7 of the second engine unit 2, and a driven member 19 connected to an output shaft 20. A gear 21 of the output shaft portion 4, secured to the output shaft 20 is engaged with the output gear 17. An output shaft 22 secured to the gear 17 is coupled to a flywheel 23 securely mounted on an output shaft 24.

In operation, at starting of the engine, both of the first and second engine units 1 and 2 are started. In small engine torque operation, the oil-pressure-operated clutch 3 is disengaged and only the power of the first engine unit 1 is transmitted to the output shaft 24. When a large power is required, for example, at starting of the vehicle or at rapid acceleration of the engine, the clutch 3 is engaged and the combined power of the first and second engine units is transmitted to the output shaft 24. When the engine load decreases, the clutch 3 is disengaged by controlling oil pressure to the clutch, so that only the first engine unit 1 provides the output power.

Figure 3:
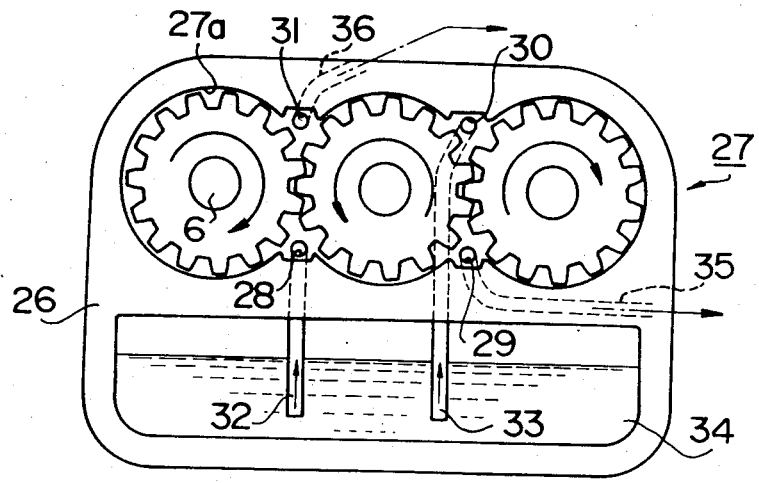
FIG. 3 is a sectional view taken along a line A—A of FIG. 2.
Figure 2:
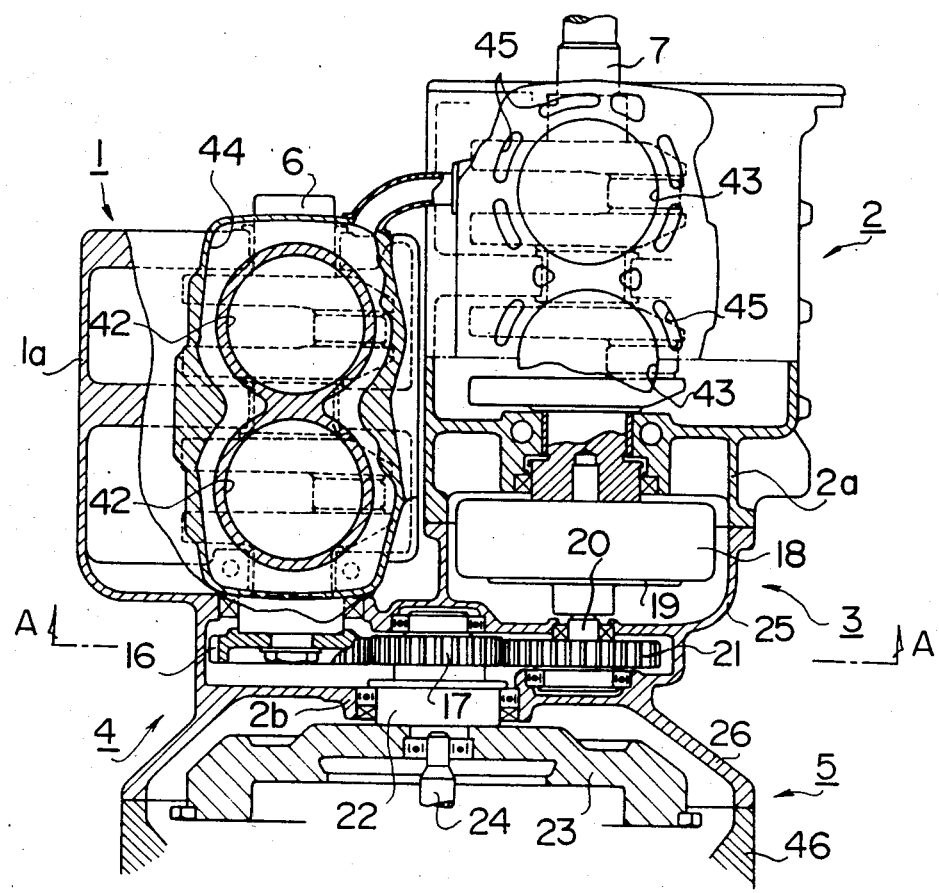
FIG. 2 is a plan view of the engine shown partly in section.
Figure 4:
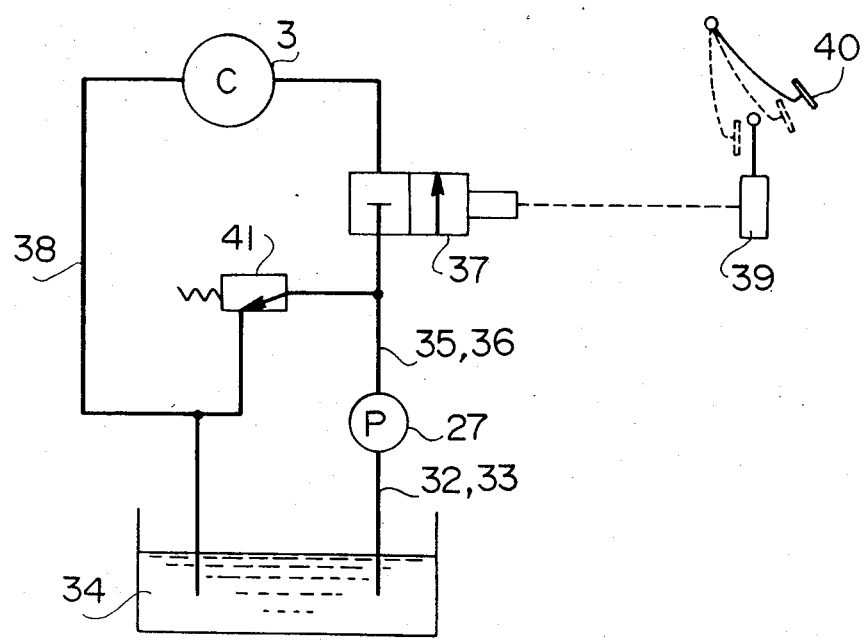
FIG. 4 is an oil hydraulic circuit for operating a clutch.

Referring to FIGS. 2 and 3, a clutch case 25 is disposed adjacent crankcases 1a and 2a of the first and second engine units 1 and 2. A gear case 26 for gears 16, 17 and 21 is formed in parallel with the clutch case 25. The gear case 26 and gears 16, 17 and 21 are arranged to form a gear pump 27 comprising a pair of gear pumps as described hereinafter. The gear pump 27 comprises a first gear pump formed by a pair of the gears 16 and 17 and a second gear pump formed by a pair of the gears 17 and 21. At lower portions of a pump chamber 27a formed by the gear case 26, an inlet 28 for the first gear pump and an outlet 29 for the second gear pump are provided and at upper portions of the chamber 27a, an outlet 31 for the first gear pump and an inlet 30 for the second gear pump are provided. Pipes 32 and 33 are connected to the inlets 28 and 30 respectively for supplying oil to the pump 27 from an oil tank 34 which is provided on the underside of the pump 27. Oil outlets 29 and 31 are connected to passages 35 and 36 for supplying pressure oil to the clutch 3 through an electromagnetic control valve 37 (FIG. 4). From the clutch, oil is returned to the oil tank 34 through a passage 38. The electromagnetic control valve 37 is operated by a signal from a switch 39 which is closd by an accelerator pedal 40 when the accelerator pedal 40 is depressed in excess of a predetermined depression.

At light load where the accelerator pedal 40 is not depressed beyond the predetermined value, the electromagnetic control valve 37 is closed (as shown in FIG. 4) and pressure oil supplied by the gear pump 27 through passages 32, 33, 35 and 36 is returned to the oil tank 34 through a relief valve 41. When the accelerator pedal 40 is deeply depressed, the switch 39 is closed so that the electromagnetic control valve 37 is opened (moving to the left in FIG. 4) for supplying oil to the clutch 3. Accordingly, the clutch 3 is engaged to transmit the output of the second engine unit 2 to the output shaft 24 through gears 21 and 17. Thus, combined power of the first and second engine units 1 and 2 is produced at the output shaft 24. In FIG. 2, numerals 42 and 43 designate cylinders of the engine units 1 and 2, 44 and 45 are water jackets and 46 is a transmission case.

The circuit comprising passages 35, 36 and 38, electromagnetic control valve 37, relief valve 41 of FIG. 4 may be provided integrally in the clutch case 25 or gear case 26.

An internal combustion engine according to the present invention comprises a plurality of engine units, and one of the engine units is connected to an output shaft of the engine through a gear train and the other engine units are connected to the output shaft through an oil-pressure-operated friction clutch. Two or more engine units are combined by controlling the clutch in accordance with the driving condition of the vehicle. Further, the gear train is formed as a gear pump for supplying oil to the clutch. Therefore, the clutch and the device for operating the clutch may be made compact in size and the structure of the engine can be simplified.

I claim:

1. In a gear and clutch system for an internal combustion engine in a veicle controlled by an accelerator pedal, the engine comprising a primary engine unit and an auxiliary engine unit, the system including an output shaft, a gear train for connecting crankshafts of the primary and auxiliary engines to the output shaft, and an oil-pressure-operated friction clutch for connecting the crankshaft of the auxiliary engine unit to the output shaft through the gear train, the improvement comprising a gear pump comprising said gear train,
a passage communicating the gear pump with the clutch,
a control valve in said passage, and
means for opening said control valve when the accelerator pedal is deeply depressed so that oil is supplied to the clutch through said passage and said control valve for engagement of the clutch.

2. The gear and clutch system according to claim 1, wherein said means comprises a switch operated by the accelerator pedal and said control valve comprises an electromagnetic control valve responsive to a condition of the switch.

3. The gear and clutch system according to claim 1, further comprising
oil passage means for enabling circulation of oil when said control valve is closed.

4. The gear and clutch system according to claim 1, wherein
said oil passage means includes a relief valve.

5. The clutch system according to claim 1, wherein
said gear pump further comprises a gear case housing said gear train.

6. The clutch system according to claim 5, wherein
said gear train comprises three gears having axes,
said gears being the same in size and having said axes arranged at the same height,
said gear case is formed with an oil tank extending thereunder and containing the oil,
said gear pump defines a space between said gears and said gear case,
said gear case is formed with oil tank passages communicating the oil tank with said space,
said passages include openings in said gear case communicating with said space adjacent a point of engagement of said gears,
said gears in cooperation with said openings for delivering oil by rotation of said gear trains.

7. The clutch system according to claim 6, wherein
said openings communicate with said space axially parallel to said axes of said gears.

* * * * *